(12) United States Patent
Koudela

(10) Patent No.: US 11,317,566 B2
(45) Date of Patent: May 3, 2022

(54) UNIVERSAL THRESHING CONCAVE FOR AN AGRICULTURAL COMBINE

(71) Applicant: Thrashmaster Combines, LLC, Brazoria, TX (US)

(72) Inventor: Chad A. Koudela, Brazoria, TX (US)

(73) Assignee: THRASHMASTER COMBINES, LLC, Brazoria, TX (US)

( * ) Notice: Subject to any disclaimer, the term of this patent is extended or adjusted under 35 U.S.C. 154(b) by 930 days.

(21) Appl. No.: 16/015,455

(22) Filed: Jun. 22, 2018

(65) Prior Publication Data
US 2018/0368325 A1    Dec. 27, 2018

Related U.S. Application Data

(60) Provisional application No. 62/524,431, filed on Jun. 23, 2017.

(51) Int. Cl.
*A01F 12/26*    (2006.01)
*A01F 12/24*    (2006.01)

(52) U.S. Cl.
CPC .............. *A01F 12/26* (2013.01); *A01F 12/24* (2013.01)

(58) Field of Classification Search
USPC ................................................ 460/107–110
See application file for complete search history.

(56) References Cited

U.S. PATENT DOCUMENTS

| | | | |
|---|---|---|---|
| 3,256,887 A * | 6/1966 | Ausherman | A01F 12/20 460/71 |
| 3,426,760 A | 2/1969 | Mark et al. | |
| 3,512,535 A | 5/1970 | Coene et al. | |
| 4,031,901 A | 6/1977 | Rowland-Hill | |
| 4,075,823 A | 2/1978 | Rowland-Hill | |
| 4,497,328 A | 2/1985 | Alm et al. | |
| 4,802,496 A | 2/1989 | Bennett | |
| 4,909,772 A | 3/1990 | Kuchar | |
| 5,024,631 A | 6/1991 | Heidjann et al. | |
| 5,057,056 A * | 10/1991 | Kambeitz | A01F 12/24 460/110 |
| 6,074,297 A | 6/2000 | Kuchar | |
| 6,193,604 B1 | 2/2001 | Ramp et al. | |
| 6,358,142 B1 | 3/2002 | Imel et al. | |
| 7,166,026 B2 | 1/2007 | Ricketts et al. | |

(Continued)

FOREIGN PATENT DOCUMENTS

| | | |
|---|---|---|
| AU | 608940 | 3/1989 |
| CA | 2599263 | 2/2009 |

(Continued)

OTHER PUBLICATIONS

PCT Search Report and Written Opinion for PCT/US18/38932, dated Sep. 24, 2018.

*Primary Examiner* — Thomas B Will
*Assistant Examiner* — Joan D Misa
(74) *Attorney, Agent, or Firm* — Remenick PLLC

(57) ABSTRACT

A universal threshing concave for an agricultural combine for harvesting different types of crops is disclosed. The threshing concave comprises a frame with a pair of opposite side members and opposite end members. The invention further comprises an array of threshing bars angled and notched along their longitudinal extent, and hexagonal in cross-section. Each bar is seated in openings in the end members of said frame.

25 Claims, 8 Drawing Sheets

(56) References Cited

U.S. PATENT DOCUMENTS

| | | | |
|---|---|---|---|
| 7,285,043 | B2 | 10/2007 | Foster et al. |
| D624,939 | S | 10/2010 | Flickinger et al. |
| 8,313,361 | B2 | 11/2012 | Flickinger et al. |
| 8,454,416 | B1 | 6/2013 | Estes |
| 9,119,349 | B2 | 9/2015 | Ricketts et al. |
| 9,504,204 | B2 | 11/2016 | Kile |
| RE46,401 | E | 5/2017 | Estes |
| 10,412,895 | B2 * | 9/2019 | Theisen .................. A01F 12/26 |
| 10,849,275 | B2 * | 12/2020 | Estes ........................ A01F 7/06 |
| 2012/0244921 | A1 | 9/2012 | Reiger et al. |
| 2014/0171164 | A1 * | 6/2014 | Foster .................... A01F 12/26 460/107 |

FOREIGN PATENT DOCUMENTS

| | | |
|---|---|---|
| CA | 203692513 | 10/2010 |
| DE | 1111446 | 7/1961 |
| DE | 10045795 | 4/2002 |
| DE | 102009047287 | 1/2011 |
| EP | 2327290 | 6/2011 |
| FR | 341090 | 7/1904 |
| FR | 670858 | 5/1929 |
| FR | 1074372 | 10/1954 |
| FR | 2621216 | 4/1989 |
| JP | 2004275085 | 10/2004 |
| JP | 2008193988 | 8/2008 |

\* cited by examiner

UNIVERSAL THRESHING CONCAVE FOR AN AGRICULTURAL COMBINE

CROSS-REFERENCE TO RELATED APPLICATIONS

This application claims priority to U.S. provisional patent application Ser. No. 62/524,431, filed Jun. 23, 2017 and entitled "Grain Damage Minimizing Grain Thrasher," which is hereby incorporated by reference in its entirety.

BACKGROUND OF THE INVENTION

A. Technical Field

The present invention generally relates to a threshing concave for an agricultural combine. More particularly, the invention disclosed herein relates to a universal threshing concave design, which could be used for harvesting different types of crops. Further, using this threshing concave design, the agriculture combine system could be able to release more grains, reduce the amount of damage and accelerate the cleaning process.

B. Description of Related Art

A modern combine harvester, or simply combine, is a versatile machine designed to efficiently harvest a variety of grain crops. The name derives from its combining three separate harvesting operations such as, reaping, threshing, and windrowing into a single process. Among the crops harvested with a combine are wheat, oats, rye, barley, maize or corn, sorghum, soybeans, flax, sunflowers and canola. The separated straw, left lying on the field, comprises the stems and any remaining leaves of the crop with limited nutrients left in it. The straw is then either chopped, spread on the field and ploughed back in, or baled for bedding and limited-feed for livestock. Combine harvesters are one of the most economically important labor-saving machines, significantly reducing the fraction of the population engaged in agriculture.

Despite great advances in mechanics and computer control, the basic operation of the combine harvester has remained unchanged almost since it was invented. FIG. 1 depicts an example of an existing combine harvester 1. Rotary combines have a rotary crop processing unit 2 that threshes and separates the grain from the harvested crop material. The rotary crop processing unit is formed by a rotor radially surrounded by a casing. The rotor and casing together define an inlet section, a threshing section and a separating section. In many combine harvester designs, the bottom of the casing has a concave under the threshing section for threshing the crop material and a separating grate under the separator section for separating the grain from the threshed crop material. The inlet 3 section pulls the harvested crop material from a front crop gathering unit into the threshing section 4. The threshing section 4 threshes the crop material and then feeds the threshed crop material to the separator section.

Within the threshing section 4, there is typically a threshing rotor 5 that tumbles the cut crops to break and shake the grains away from their stalks. One or more concaves 6 are typically positioned below and work in conjunction with the threshing rotor 5. FIG. 1 shows three concaves. Generally, each concave 6 is provided with a combination of threshing elements in the form of straight bars square in cross-section that are spaced apart from one another with wires between the bars. The objective of the bars and wires is to restrict the flow of crop material so as to enhance threshing of the crop material in the threshing section. However, for harvesting corn crops, a tendency frequently develops for crop material flow to be restricted too much by corn shucks getting hung up on the bars and catching on the wires, resulting in clogging of the concave. One solution of the prior art is to change the threshing elements of the concave to round bars with no wires. In some previous inventions, the concave with an array of longitudinal notched and spaced apart threshing elements is disclosed. However, a tendency frequently develops under some crop conditions, other than corn, for too little restriction of crop material flow such that the other crop materials are not threshed effectively, resulting in overloading of the separator section.

From the concave, the crop enters a collection tank 7 via augers 8. The chaff (unwanted material) passes thru the rotor to the discharge beater or chopper toward the rear of machine 1. When the collection tank 7 is full, a collection vehicle pulls alongside the combine. The grain is carried up from the tank by an elevator and shoots out of a side pipe 9 (sometimes called the unloader) into the collection vehicle. The unwanted chaff tumbles from the back of the machine 1. Some combines have a rotating spreader mechanism that throws the straw over a wide area. Often the straw is baled up by a baling machine and used for animal bedding.

In the light of above-mentioned issues, there exists a need for a universal threshing concave design for an agricultural combine, which could be used for harvesting different types of crops. Further, there is a need for a threshing concave that could be able to release more grains, reduces grain damage and accelerates the following cleaning process.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor it is intended for determining the scope of the claimed subject matter.

The present invention discloses a threshing concave for an agricultural combine. According to the present invention, the threshing concave for an agricultural combine, comprises a frame. The frame includes a pair of opposite side members, and a pair of opposite end members. The side members and the end members join together to make a rectangular frame. Each opposite end member comprises an upper portion with a top edge thereon. In addition, the opposite end members include a plurality of hexagonal shaped openings formed in said upper portion of said each opposite end member adjacent to and below said top edge.

In one aspect of the present invention, the frame further comprises an array of elongated threshing bars. Each threshing bar is positioned at an angle to both the side members and each other threshing bar such that the threshing bars are not parallel to each other. Each bar is seated in a respective one of said openings in said opposite end members of said frame.

In one aspect, each bar comprises a lower portion, an upper portion and a notch. In one aspect, the lower portion of said each bar has substantially a half or semi-hexagonal configuration in cross-section. The upper portion of said each bar has substantially a quarter hexagonal configuration in cross-section. Further, the bar includes a notch defining an aggressive threshing edge recessed into said bar, which is adjacent to said upper portion of said bar and above said lower portion of said bar. In one aspect, the notch is longitudinally extending between said opposite ends of said bar such that, each of said notches is disposed adjacent to said upper portions of said end members of said frame and face opposite to the direction of crop material flow. In one aspect of the present invention, the notch in each bar is defined by a first surface on said lower portion of said bar and a second surface on said upper portion of said bar extending upright from and in transverse relation to said first surface. In some embodiments, the length of the first surface is around 0.25 inch and the length of the second surface is around 0.375 inch.

In one aspect, the frame further includes at least one intermediate member spaced between and extended generally parallel to said opposite end members. The intermediate member is also extended between and joined to said opposite side members. In one aspect, said intermediate member also comprises a top edge and a plurality of openings. The openings of the said intermediate member is positioned adjacent to and below said top edge such that said bars are seated in said openings of said intermediate member.

In one aspect, the openings are formed in said opposite end and intermediate members such that said notches of said bars seated in said openings are disposed substantially above said top edges of said end and intermediate members. In another aspect, the openings are formed in said opposite end and intermediate members such that said notches of said bars seated in said openings are disposed substantially below said top edges of said end and intermediate members.

In one embodiment, the spacing between said openings of said opposite end members and the spacing between said bars seated in said openings increases and decreases in width from one bar to the next to form a pattern, for example as shown in FIG. 2. In some embodiments, the spacing between said openings of said opposite end members ranges from 0.75 inch to 1 inch, thereby allowing the grain to escape at around a 30° angle. In one embodiment, the rear side of the threshing bars is removably attached to a cover plate, to allow air flow out of the said concave.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein.

DETAILED DESCRIPTION OF EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The present invention discloses a universal threshing concave design for an agricultural combine, that could be applicable for harvesting different types of crops. The threshing concave may be original to the combine or may be add to the combine later as an aftermarket device. The threshing concave according to the present invention further helps in accelerating the threshing process of grains by accelerating the separation process. Further, using the threshing concave described herein, the agriculture combine system could be able to release more than 80%, 85%, 90%, or more of the grains sooner, therefore allowing greater yield. A faster the release of grains from the threshing section reduces the amount of damage and accelerates the cleaning process.

Figure 1:
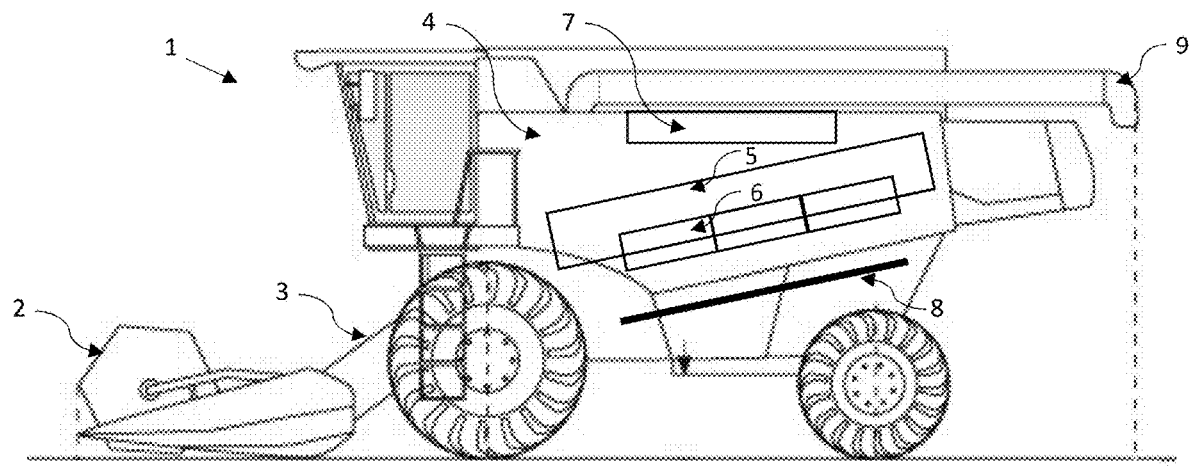
FIG. 1 illustrates a general configuration of a combine harvester.
Figure 2:
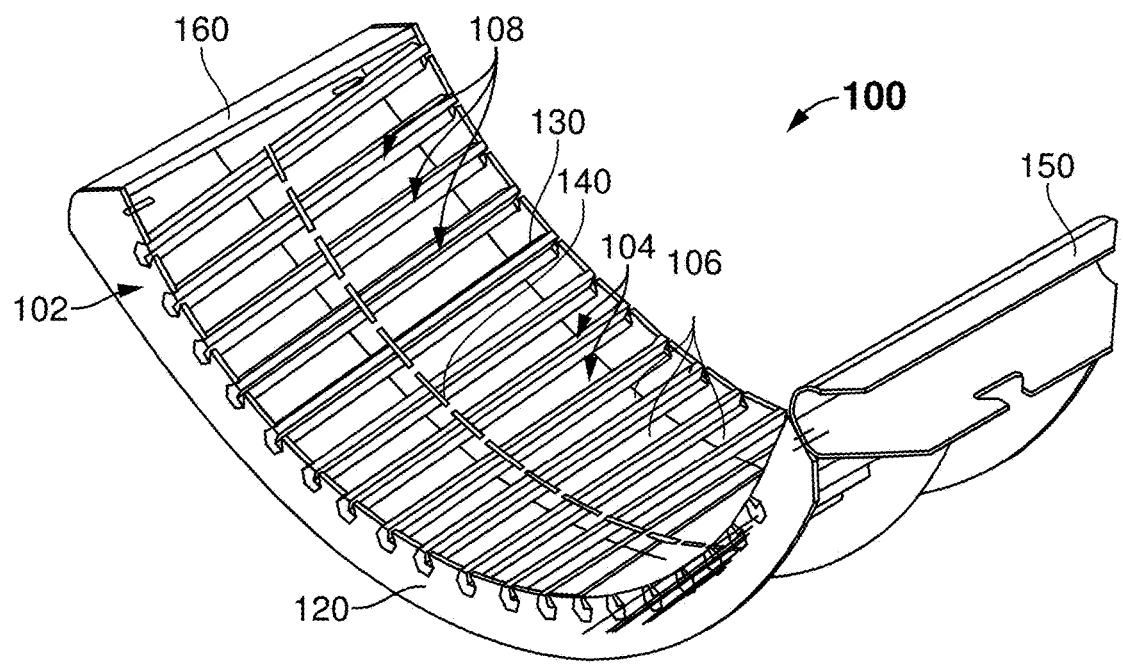
FIG. 2 illustrates a perspective view of an embodiment of a universal threshing concave, incorporating the aspects of the present embodiment.

Referring to FIG. 2, a perspective view of the threshing concave 100 according to the present invention, is disclosed. In an embodiment, the concave 100 includes a frame 102 and an array 104 of elongated threshing elements or bars 106 supported by the frame 102. The components of the concave 100 are made of a suitable substantially rigid material, such as steel, aluminum, brass, plastic, carbon fiber, titanium, or other naturally occurring or manmade materials. The frame 102 is formed by opposite end members (120 and 130), one or more intermediate members 140 and opposite side members (150 and 160). Preferably side member 150 is an adapted to connect to and pivot about a pivot point within the combine. Preferably side member 160 is free to move. In one embodiment, the opposite end members (120 and 130) being substantially identical configuration, are spaced apart from one another and extend generally parallel to one another. The end members (120 and 130) and intermediate member 140, are in the form of relatively thin elongated plates. The intermediate member 140 is spaced substantially equidistantly between the end members (120 and 130) and extends generally parallel thereto.

Figure 3:
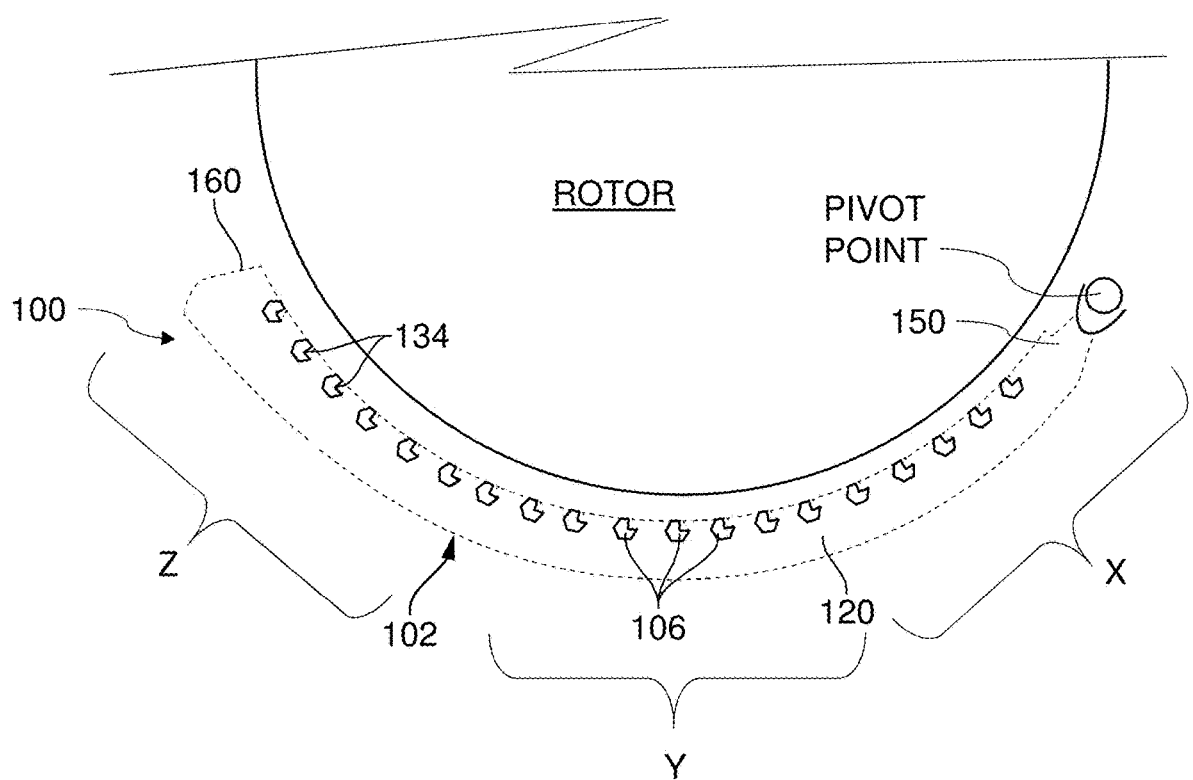
FIG. 3 illustrates an end elevational view of the concave of FIG. 2, incorporating the aspects of the present embodiment.
Figure 4:
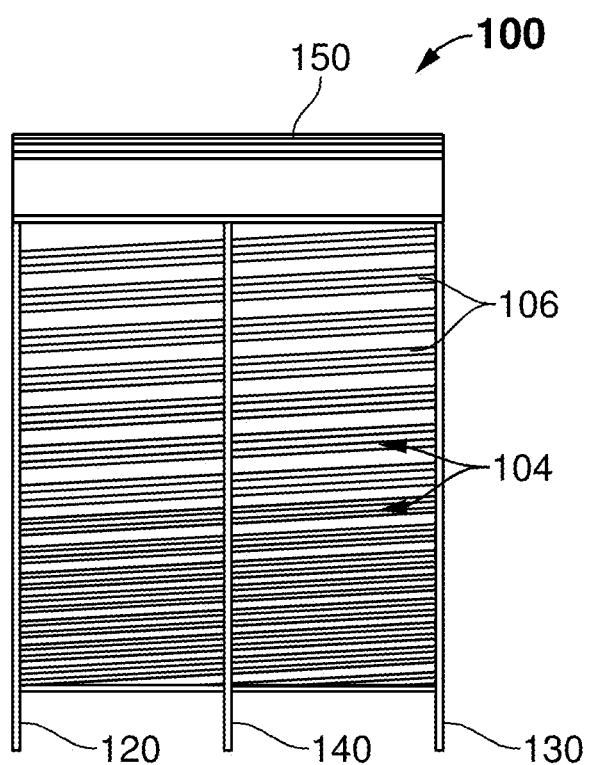
FIG. 4 illustrates a side elevational view of the concave of FIG. 2, incorporating the aspects of the present embodiment.

Referring to FIG. 2-FIG. 4, the end (120 and 130) and intermediate members 140 together are similarly curved in configuration and have respective inner top edges (120A, 130A, 140A). The curvature of the inner top edges (120A, 130A, 140A) changes in diameter from side member 150 to side member 160. For example, as shown in FIG. 2, portion X of concave 100 may have a first curvature allowing concave 100 to connect to and pivot about the pivot point, portion Y of concave 100 may have a second curvature bringing concave 100 into close proximity to the rotor, and portion Z of concave 100 may have a third curvature to curve around the rotor. In a preferred embodiment, portion Y of concave 100 may be longer than portions X and Z. Additionally, portion Z of concave 100 may have a flatter curve than portions X and Y. The changes in curvature of concave 100 preferably allow for better thrashing a close proximity to the rotor. For example, the closer proximity may allow for 10%, 15%, or 20% more yield over traditional concaves. Additionally, the close proximity to the rotor allows the threshing bars 106 to be spaced further apart, thereby being gentler on the grains.

Figure 5A:
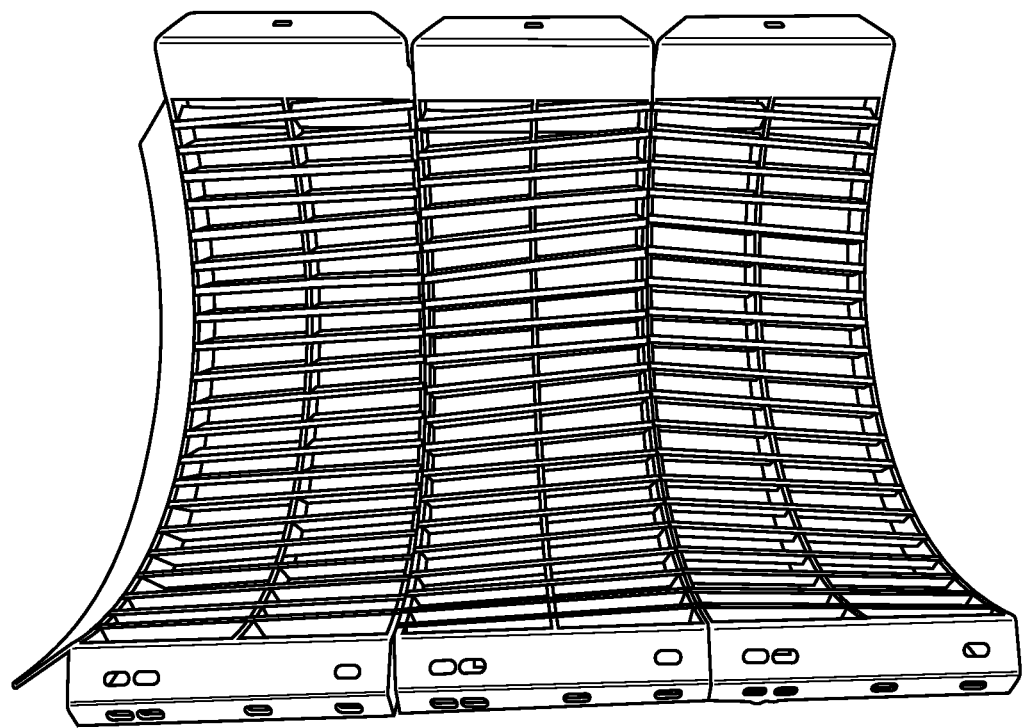
FIGS. 5A and 5B depict two views of three adjacent concaves of FIG. 2, incorporating the aspects of the present embodiment.
Figure 5B:
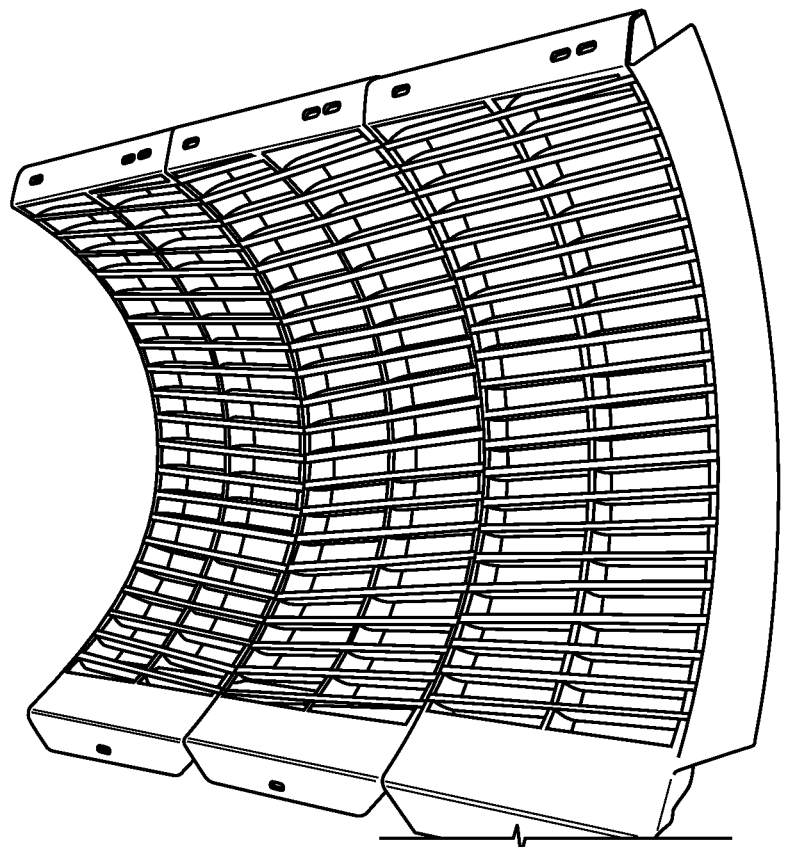
Figure 6:
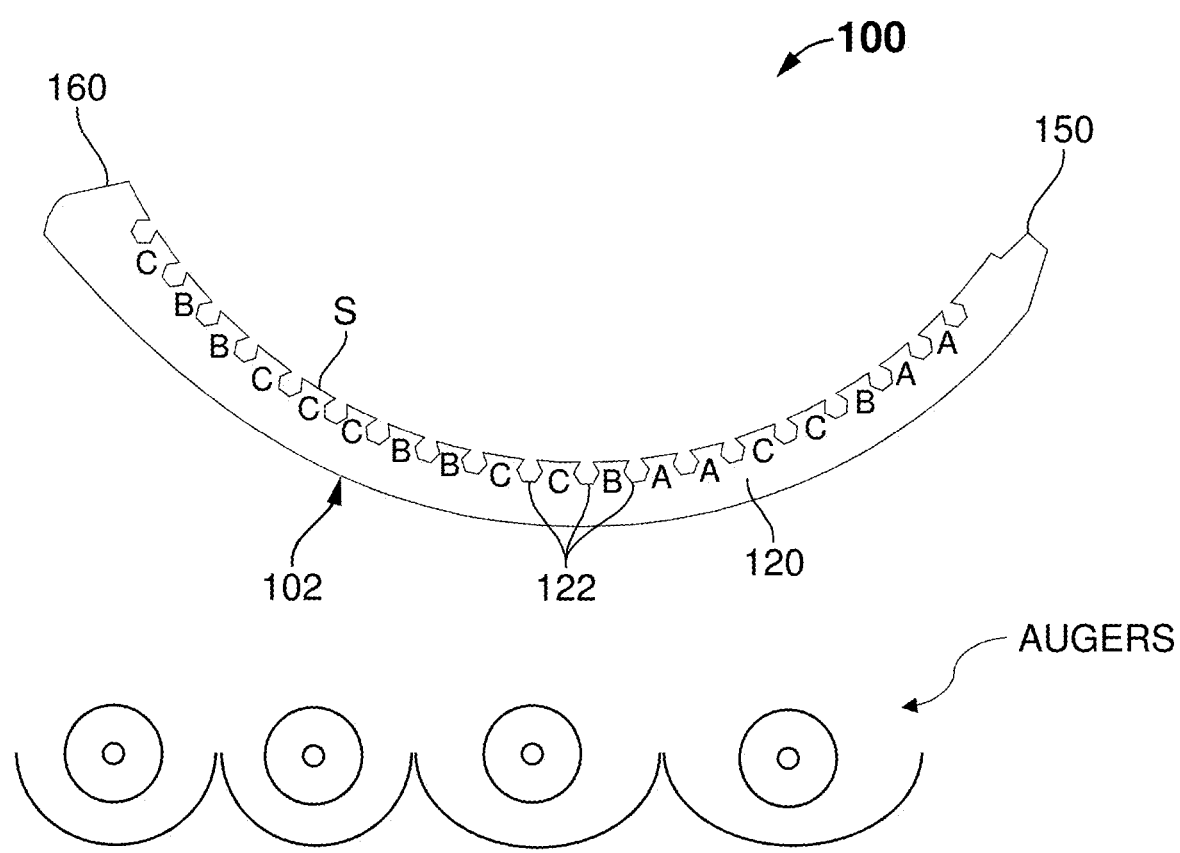
FIG. 6 illustrates an embodiment of an end elevational view of one threshing bar, incorporating the aspects of the present embodiment.

Referring to FIG. 6 (showing end member 120), the end (120 and 130) and intermediate members 140 each comprise a plurality of openings 122, more particularly, in configurations of slots or recesses, spaced apart from one another and formed in the upper portions of each of the end (120 and 130) and intermediate members 140, below and open at their inner top edges (120A, 130A, 140A). As threshing elements 106 are positioned at an angle to each other, the position and configuration of openings 122 shown in end member 120 do not correspond with and would not be the same as the position and configuration of openings 122 in either end member 130 or intermediate members 140. As can be seen in FIGS. 5A and 5B, when several concaves are arranged adjacent to each other (as they would be positioned in the combine), the threshing elements 106 from one concave do not follow to the next concave. Instead, they are preferably staggered from one concave to the next for more efficient thrashing and separation. In some embodiments, the angle of the threshing elements 106 may be reversed from one concave to the next. The arrangement of the adjacent concaves depends on the configuration of the combine. For example, a combine may have space for three concaves in a row or may have space for two right hand concaves and two left hand concaves.

In one embodiment, the side members (150 and 160) of the frame 102 are spaced from one another and extend generally parallel to one another. The side members (150 and 160) also extend transversely between and are rigidly joined to corresponding ends of the curved (120 and 130) and intermediate members 140. The side members (150 and 160) are straight in configuration for supporting the frame 102 as part of the casing below the rotor of the combine.

Again, referring to FIG. 1-FIG. 4, the array 104 of elongated threshing elements 106 supported by the frame 102 is in the form of a plurality of elongated longitudinally-notched spaced-apart bars 106 supported by the frame 102. In one embodiment, the bars 106 are angled in longitudinal extent, and hexagonal in cross-section, and extend between the opposite end members (120 and 130) past the intermediate member 140 of the frame 102. In some embodiments, the angle of the bars is on a slight angle ranging from, for example, 8-12° 6-14°, 4-16°, or another range against the flow of crop material through the rotor. Preferably, the angle between the bars 106 changes from one bar to another so that the bars are not parallel to each other. This angled bar helps in accelerating the separation or cleaning process. The angle from one bar to the next can be both positive or negative in the range. For example, the farthest rear section preferably switches from a negative angle against the flow of rotor to a positive angle going with the flow to accelerate the separation process. The threshing concave 100, according to the present invention, could release sooner 80% or more amount of grains, which also reduces the damages to the grains. In one embodiment, the bars 106 are seated in the shape-conforming concave slots or recesses 122 formed in the end (120 and 130) and intermediate members 140 of the frame 102. Further, the bars 106 are affixed, using any suitable technique, such as by welding, brazing, epoxy, mechanical fasteners, or other coupling devices or methods, to the end (120 and 130) and intermediate members 140 of the frame 102.

Figure 7:
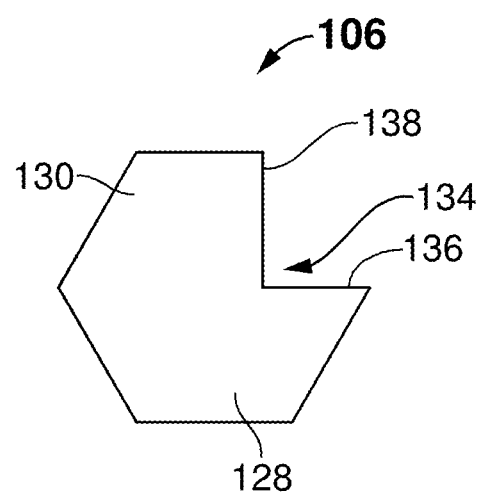
FIG. 7 illustrates a configuration of spacing between the openings in the threshing concave, incorporating the aspects of the present embodiment.

Referring to FIG. 7, each elongated bar 106 preferably has a lower portion 128, an upper portion 132 and a longitudinally-extending notch 134 (also shown in FIG. 2). The lower portion 128 of each bar 106 has about a semi- or half-hexagonal configuration in cross-section. The lower portion 128 is preferably adapted to be seated in the shape-conforming concave slots or recesses 122 spaced apart from one another and formed in the frame end (120 and 130) and intermediate members 140 below and open at their inner top edges (120A, 130A, 140A). The upper portion 132 of each bar 106 has about a quarter-hexagonal configuration in cross-section. In one embodiment, the depth of the recesses 122 into frame members (120, 130, 140) are such that the notches 134 of the bars 106 seated in the recesses 122 are disposed substantially within the top edges (120A, 130A, 140A) of the frame members (120, 130, 140). Preferably each bar 106 is coupled to frame members (120, 130, 140) such that the upper surface of the upper portion 132 is flush with the inner top edges (120A, 130A, 140A) and the first surface 136 is below the inner top edges (120A, 130A, 140A). In other embodiments the upper surface of the upper portion 132 may be above or below the inner top edges (120A, 130A, 140A).

In one embodiment, the longitudinally-extending notch 134 in the bar 106 is defined by first and second surfaces (136 and 138) formed on the bar 106 and disposed in a transverse relation to one another, for example through an angle of about 90°. The first surface 136 lies on the lower portion 128 of the bar 106, extending longitudinally along the bar 106, forwardly of the upper portion 132 and above the lower portion 128 of the bar 106. In one embodiment, the second surface 138 lies on the upper portion 132 of the bar 106, extending upright from and in the transverse relation to the first surface 136, within the inner top edges (120A, 130A, 140A) of the end and intermediate members (120, 130, 140) of the frame 102 and toward the rotor of the crop material harvesting machine.

In one embodiment, the second surface 138 faces in a direction opposite to the direction of rotation of the rotor relative to the frame 102 such that the second surface 138 defines an exposed forward-facing relatively aggressive threshing edge on the bar 106 for restricting the flow of crop material over the bar 106 while the first surface 136 defines an exposed upward-facing edge on the bar 106 for restricting the flow of crop material outwardly through the spaces 108 between the bars 106. In some embodiments, the length of the first surface 136 is around 0.25 inch and the length of the second surface 138 is around 0.375 inch, however either surface can be larger or smaller. The squared edge configuration of the second surface 138 is configured to thresh against and create a cushion pocket for the contacting grains.

Figure 8:
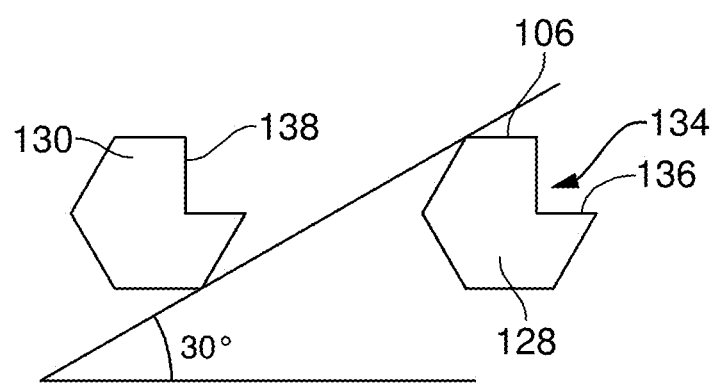
FIG. 8 illustrates an angle of allowance for grain flow from the threshing concave of FIG. 2, incorporating the aspects of the present embodiment.

Referring to FIG. 8, the space 108 between the recesses 122 and between the seated bars 106 preferably increase and decreases in width or are more or less open from one bar to the next to form a pattern, for example as shown in FIG. 2, to aid in removing crop material sooner to avoid overloading the following cleaning or separation section of the casing. By way of example, not as a limitation, the widths of the spaces 108 may increase from the smallest of about 0.75±0.125 inch to the largest of about 1±0.125 inch. In some embodiments, the widths of the spaces 108 may increase from the smallest of about 0.625 inch to the largest of about 1 inch. In some examples, as shown in FIG. 6, the space 108 between the recesses 122 and between the seated bars 106 at point A has about 0.75±0.125 inch, point B has 0.875±0.125 inch, and point C has 1±0.125 inch. The spacing between the recesses 122 is preferably determined by the location of the augers below the concave. For example, preferably the largest spaced openings (e.g. C in FIG. 8) are positioned directly above the augers while the more closely spaced openings are positioned between and to the sides of the augers. Preferably, the spacing for each concave is customized based on the configuration of the combine.

Depending on the position or location of the concave, for example, front or rear end of the machine, the space 108 of bars 106 may vary by 0.1 inch, 0.125 inch, 0.15 inch, 0.175 inch, 0.2 inch, or more. In one example, the bars 106 are placed closer in the front concave sections (portion X in FIG. 3) compared to the rear concave section (portion Z in FIG. 3). This facilitates aggressive threshing action in the front concave section, and the rear concave section could be utilized for separating the grains rather than carrying more grain to the following separation section of the casing. Referring to FIG. 8, by using hexagonal bar 106 of diameter 0.75 inch with a bar spacing 1 inch, allows flow or release of grains at an angle about 30°. This results in the easiest path of resistance for grains to escape with less obstruction and without being damaged.

Figure 9A:
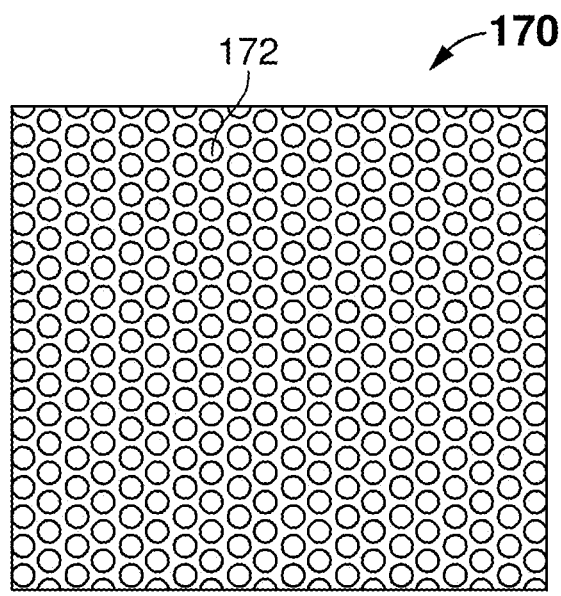
FIG. 9A illustrates one configuration of cover plate removably attached under the threshing bar, incorporating the aspects of the present embodiment.
Figure 9B:
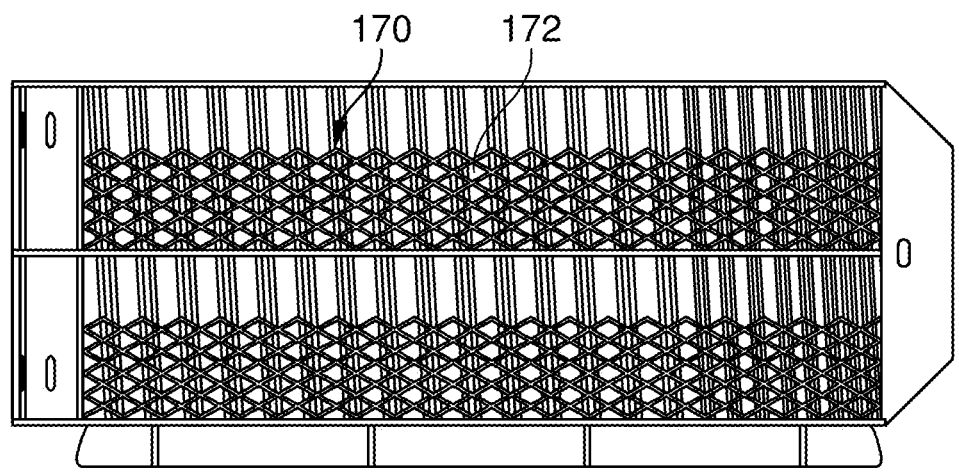
FIG. 9B illustrates another configuration of cover plate removably attached under the threshing bar, incorporating the aspects of the present embodiment.

Referring to FIG. 9A and FIG. 9B, the bottom or rear portion of the concave section 100 incorporated with a removable cover plate or cover member 170. The cover plate 170 comprises different sized opening 172, which allow the material aggressively forced against the bar 106, due to the fact that they allow air alone to flow thru and not material. The cover plate 170 further facilitates disruption on grain flow, which is configured to engage within the system to provide efficient threshing action.

According to the present invention, the hexagonal configuration of threshing bar 106 has a large flat surface area and squared edges, which allows thresh against grain flow with an angle on the backside of the threshing point to allow grain to escape easier without damage, compared to existing angles, for example, 52°. This configuration further comprises less sharp edges with more flat surface area for the crop to rub against, compared to the existing arts comprising more squared edges, causing more damage to the grains in hard thrashing conditions. The concave section 100 according to the present invention allows less than 7 to 10 grains to contact points per revolution, which minimizes the damages to the grain.

The foregoing description comprises illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein.

What is claimed is:

1. A threshing concave for an agricultural combine, comprising:
   a curved frame comprising two curved end members extending between two side members; and
   a plurality of straight threshing bars, each threshing bar extending between the two curved end members, wherein the threshing bars are positioned at non-perpendicular angles to the two curved end members and between the two curved end members and each threshing bar is positioned at a non-parallel angle to the adjacent threshing bars.

2. The threshing concave of claim 1, wherein each threshing bar is hexagonal in cross section and has a recess running a length of the threshing bar.

3. The threshing concave of claim 2, wherein the recess is notch removed from an upper quarter of the threshing bar.

4. The threshing concave of claim 1, wherein there are a plurality of cutouts in each curved end member, wherein each cutout is adapted to receive one threshing bar.

5. The threshing concave of claim 4, wherein an upper surface of each threshing bar is flush with an upper surface of each curved end member.

6. The threshing concave of claim 1, wherein the space between threshing bars is not consistent.

7. The threshing concave of claim 1, wherein the concave is adapted to thresh multiple crops without adaptation.

8. The threshing concave of claim 1, further comprising at least one intermediate member, wherein the at least one intermediate member is positioned between and parallel to the two curved end members.

9. The threshing concave of claim 1, wherein a curvature of the at least one intermediate member is the same as the curvature of the two curved end members.

10. The threshing concave of claim 1, further comprising removable cover plate positioned below the plurality of threshing bars.

11. The threshing concave of claim 1, further comprising a pivot point coupled to one side member and adapted to be coupled to the agricultural combine.

12. The threshing concave of claim 1, wherein the angle between adjacent threshing bars is between 8 and 12°.

13. An agricultural combine, comprising:
   a rotor;
   at least one threshing concave, wherein the threshing concave comprises:
      a curved frame comprising two curved end members extending between two side members; and
      a plurality of straight threshing bars, each threshing bar extending between the two curved end members, wherein the threshing bars are positioned at non-parallel angles to the two curved end members and between the two curved end members and each threshing bar is positioned at a non-parallel angle to the adjacent threshing bars.

14. The agricultural combine of claim 13, wherein each threshing bar is hexagonal in cross section and has a recess running a length of the threshing bar.

15. The agricultural combine of claim 14, wherein the recess is notch removed from an upper quarter of the threshing bar.

16. The agricultural combine of claim 13, wherein there are a plurality of cutouts in each curved end member, wherein each cutout is adapted to receive one threshing bar.

17. The agricultural combine of claim 16, wherein an upper surface of each threshing bar is flush with an upper surface of each curved end member.

18. The agricultural combine of claim 13, wherein the space between threshing bars is not consistent.

19. The agricultural combine of claim 13, wherein the concave is adapted to thresh multiple crops without adaptation.

20. The agricultural combine of claim 13, the concave further comprising at least one intermediate member, wherein the at least one intermediate member is positioned between and parallel to the two curved end members.

21. The agricultural combine of claim 13, wherein a curvature of the at least one intermediate member is the same as the curvature of the two curved end members.

22. The agricultural combine of claim 13, the concave further comprising removable cover plate positioned below the plurality of threshing bars.

23. The agricultural combine of claim 13, the concave further comprising a pivot point coupled to one side member and adapted to be coupled to the agricultural combine.

24. The agricultural combine of claim 13, wherein there are two or more adjacent concaves.

25. The combine of claim 13, wherein the angle between adjacent threshing bars is between 8 and 12°.

* * * * *